Nov. 11, 1969  M. LICHTENWALTER ET AL  3,477,919
REMOVAL OF METHYL FORMATE FROM PROPYLENE OXIDE
BY TREATMENT WITH CALCIUM HYDROXIDE
Filed July 11, 1968

INVENTORS.
MYRL LICHTENWALTER,
SIMON P. BURNS,
BY
ATTORNEY.

United States Patent Office 3,477,919
Patented Nov. 11, 1969

3,477,919
REMOVAL OF METHYL FORMATE FROM PROPYLENE OXIDE BY TREATMENT WITH CALCIUM HYDROXIDE
Myrl Lichtenwalter and Simon Pierce Burns, Austin, Tex., assignors to Jefferson Chemical Company, Inc., Houston, Tex., a corporation of Delaware
Continuation-in-part of application Ser. No. 655,771, July 25, 1967. This application July 11, 1968, Ser. No. 744,014
Int. Cl. B01d 3/34
U.S. Cl. 203—36        5 Claims

ABSTRACT OF THE DISCLOSURE

Propylene oxide prepared by the oxidation of alkanes or olefins is contaminated with other oxidation products, including methyl formate which boils very near the boiling point of propylene oxide, making separation of the two by distillation impractical. The methyl formate impurity can be removed from the contaminated propylene oxide by reaction with an aqueous slurry of calcium hydroxide.

CROSS REFERENCE TO RELATED APPLICATION

This is a continuation-in-part of application Ser. No. 655,771, filed July 25, 1967, which is now abandoned.

BACKGROUND OF THE INVENTION

It is known to prepare propylene oxide by the oxidation of aliphatic hydrocarbons such as propane or butane, or the oxidation of an olefin such as propylene. Such reactions result in complex mixtures containing a number of other oxidation products in addition to the propylene oxide. One such oxidation product is methyl formate, which has a boiling point very near that of propylene oxide, making separation of the two by distillation impractical. However, in order to obtain propylene oxide suitable for certain applications, such as the manufacture of polyether polyols for use in the preparation of polyurethanes, it is necessary to substantially completely remove the methyl formate from the propylene oxide.

Propylene oxide is a useful article of commerce. It is used as a starting material for the preparation of antifreeze composition, humectants, pharmaceutical preparations, cosmetic formulations and as monomers for the preparation of polymers useful in preparing polyurethanes.

In U.S. Patents 2,550,847, Mitchell (1951), and 2,622,060, Robeson (1952), it is proposed to remove the methyl formate by hydrolysis with alkaline compounds such as sodium hydroxide, potassium hydroxide, sodium carbonate or sodium bicarbonate. However, both of these procedures suffer from the disadvantages of incomplete removal of methyl formate or hydrolysis of propylene oxide to propylene glycol resulting in a loss of the desired propylene oxide product, and these disadvantages make the procedures impractical. An acceptable loss of propylene oxide in an industrial process is about one percent. However, the use of saponifying agents for methyl formate as taught by the art, supra, results in losses of from 10 to 50% propylene oxide when complete removal of methyl formate is accomplished. Our invention is of special significance because, surprisingly, practically complete removal of methyl formate is accomplished using our invention without significant loss of propylene oxide.

SUMMARY OF THE INVENTION

We have discovered that methyl formate can be substantially completely removed from propylene oxide which is prepared by the oxidation of alkanes or olefins without appreciable hydrolysis of propylene oxide to propylene glycol by a reaction of the contaminated propylene oxide with an aqueous slurry of calcium hydroxide wherein at least a stoichiometric amount of calcium hydroxide based on the methyl formate in the propylene oxide is used. By using our process, propylene oxide containing no detectable methyl formate is obtained without significant loss of propylene oxide.

DESCRIPTION OF THE DRAWING

The column used for the continuous process of this invention is illustrated on the flow sheet which shows the column consisting of three sections, 2, 3 and 4. A condenser is shown on the top of the section 4. A feed section for propylene oxide is at 1 and a slurry feed section is at 5. The propylene oxide receiver is at 6 and the aqueous lime slurry is removed as bottoms at 7.

DESCRIPTION OF THE PREFERRED EMBODIMENTS

Batch process

Five hundred grams of propylene oxide contaminated with methyl formate and other oxidation products prepared by the oxidation of propylene and 50 grams of water are charged to a one-liter flask fitted with a stirrer, reflux condenser, and thermometer. The mixture is heated to about 36° C. and 31 grams of calcium hydroxide [$Ca(OH)_2$] is added which is about 1.25 mols $Ca(OH)_2$ to 1 mol methyl formate. The mixture is sampled periodically and the samples are analyzed by gas phase chromatography. The analyses of seven samples based on weight percent are shown in Table I. The water content of the samples is not shown in the table.

TABLE I

| Sample | Time, Minutes | Methyl Formate | Propylene Oxide | Other Oxidation Products | Propylene Glycol |
|---|---|---|---|---|---|
| 1 | 0 | 4.03 | 85.38 | 10.59 | |
| 2 | 5 | 2.02 | 84.07 | 13.90 | |
| 3 | 10 | 1.76 | 86.78 | 11.46 | |
| 4 | 15 | 1.40 | 87.27 | 11.32 | |
| 5 | 30 | 0.58 | 88.19 | 11.22 | |
| 6 | 60 | 0.01 | 89.45 | 9.86 | 0.13 |
| 7 | 120 | 0 | 91.69 | 8.26 | 0.05 |

The samples in Table I show that as the concentration of methyl formate decreases due to reaction with $$Ca(OH)_2$$

the concentration of propylene oxide becomes greater, illustrating that propylene oxide is not lost due to hydrolysis to propylene glycol.

Propylene oxide is fed directly to a drying column after excess lime and calcium formate are removed from the product. After the propylene oxide is dried, the remaining impurities are removed by distillation.

The data in Samples 2–8 of Table II show results wherein propylene oxide synthetically contaminated with methyl formate is reacted with NaOH in a stirred batch process. The data in Sample 1 of Table II show results wherein propylene oxide prepared by the oxidation of propylene and contaminated with methyl formate and other organic products is reacted with NaOH in a stirred batch process. The data in Table II illustrate that complete methyl formate removal is not accomplished with NaOH without hydration of a significant amount of the propylene oxide to propylene glycol. Water is the solvent for the caustic solutions of Table II.

To compare our invention with the prior art, Samples 5 and 6 of Table II illustrate in experiments comparable to Sample 6 of Table I, supra, that the concentration of propylene oxide is substantially reduced in a propylene oxide-methyl formate mixture when methyl formate is removed therefrom with a NaOH solution. This high loss of propylene oxide is not acceptable for an industrial process.

TABLE II

| Sample | Feed | | Caustic Solution | | Temp., °C. | Holding Time, Minutes | Oxide Recovery, Wt. percent | Percent Methyl Formate in Effluent |
|---|---|---|---|---|---|---|---|---|
| | Percent Methyl Formate | Percent Propylene Oxide | Percent Excess NaOH | Percent Caustic Solution | | | | |
| 1 | 23.5 | 71.6 | 10 | 16.3 | 50 | 30 | 22 | 0.1 |
| 2 | 0.1 | 99.9 | 10 | 50 | 35 | 60 | 99+ | 0.1 |
| 3 | 0.5/0.4 | 99.5 | 10 | 50 | 35 | 60 | 99+ | 0.4 |
| 4 | 5.0 | 95.0 | 10 | 50 | 35 | 60 | 99+ | 3.7 |
| 5 | 5.0 | 95 | 110 | 33 | 53 | 60 | 90 | 0.3 |
| 6 | 5 | 95 | 10 | 33 | 50 | 60 | 90 | 1.6 |
| 7 | 5 | 95 | 10 | 33 | 50 | 120 | 90 | 1.6 |
| 8 | 10 | 90 | 10 | 33 | 50 | 120 | 90 | 2.9 |

Continuous process

In addition to removing methyl formate from contaminated propylene oxide by the batch process described, supra, methyl formate can be removed from propylene oxide without appreciable hydrolysis of propylene oxide to propylene glycol by a countercurrent reaction and distillation of the contaminated propylene oxide with an aqueous slurry of calcium hydroxide and a temperature above the boiling point of propylene oxide but below about 100° C. In the practice of this species of our invention for the removal of methyl formate from propylene oxide, the mixture of propylene oxide and methyl formate is continuously introduced into a column, while an aqueous slurry of calcium hydroxide is simultaneously continuously introduced into the column at a point above the point at which the propylene oxide is introduced. The propylene oxide, substantially free of methyl formate, is taken overhead from the column while the aqueous slurry containing unreacted calcium hydroxide and alkaline earth metal formate is removed from the bottom of the column. The temperature at which the column is operated should be above the boiling point of propylene oxide but below a temperature of about 100° C. The preferred temperature range is 35° to about 100° C. The feed rates of the two streams are controlled and correlated with the temperature such that the amount of calcium hydroxide introduced is at least stoichiometrically equivalent to the methyl formate in the propylene oxide stream and the amount of propylene oxide contained in the bottoms stream from the column is minimized.

The feed points for the two streams are positioned with respect to each other in such a way that there will be countercurrent flow in the column. To accomplish this the aqueous slurry of the calcium hydroxide is fed to the column at a point above the feed point for the propylene oxide stream. The two feed streams then move in opposite directions through the column since the propylene oxide stream moves upward and the aqueous slurry moves downward.

The column is operated at a temperature above the boiling point of propylene oxide to minimize losses of propylene oxide in the bottoms. The boiling point of propylene oxide will vary with the pressure under which the column is operated. However, this temperature may be readily determined for any given pressure. At a temperature of about 100° C. hydrolysis of propylene oxide to propylene glycol begins to occur. The rate of hydrolysis increases as the temperature increases; therefore, for maximum recovery of propylene oxide the temperature should be maintained below about 100° C. It is to be understood that temperature above 100° C. may be employed if no effort is being made to minimize conversion of propylene oxide to propylene glycol.

The feed rates of the propylene oxide and aqueous slurry streams are correlated with the temperature such that for a given column the amount of propylene oxide in the bottoms stream is minimized. Ideally, no propylene oxide will be found in the bottoms. The particular correlation of feed rates and temperatures will depend upon the particular column employed. For a given column operated at a given temperature, optimum feed rates may be determined experimentally by analyzing the bottoms for propylene oxide and adjusting feed rates until the propylene oxide content reaches a minimum.

Our continuous process will be further illustrated by the following examples:

Example I.—Referring to the drawing, the column used consisted of three sections 2, 3, and 4. The bottom 2 and center 3 sections were two-inch internal diameter pipe and were, respectively, 12 inches and 18 inches in length. The top section 4 was 18 inches long and had an internal diameter of one inch. All sections were packed with ¼ inch stainless steel rings. The propylene oxide was fed at 1 between the bottom 2 and center 3 sections and the aqueous slurry was fed at 5 between the center 3 and top 4 sections. The propylene oxide feed stream was prepared from 990 grams of propylene oxide and 10 grams of methyl formate and the calcium hydroxide slurry feed was prepared from 900 grams of water and 100 grams of lime. The propylene oxide and the lime slurry were fed to the column continuously. The column reboiler pot was maintained at a temperature of 99° to 100° C. The temperature at the oxide feed point varied from 40° to 100° C. and the temperature at the lime slurry feed point varied from 35° to 55° C. The streams were fed at such a rate that no propylene oxide was in the bottoms stream. Propylene oxide was taken overhead 6 from the column while the aqueous lime slurry was removed as bottoms 7. A total of 260 grams of the propylene oxide feed and 350 ml. of the lime slurry were fed over a period of 35 minutes. Chromatographic analysis of the column overhead showed it to contain 99.2% propylene oxide, 0.1% methanol, 0.7% water and no methyl formate. The chromatographic analysis of the liquid portion of the bottoms showed it to be 99.9% water.

Example II.—The column described in Example I was fitted with a recirculating pump so that the lime slurry could be recirculated from the reboiler to the column at a rapid rate (up to about 9,000 ml. per hour). A total of 1,000 grams of a 95 wt. percent propylene oxide, 5 wt. percent methyl formate feed was fed to the column at the lower feed point over a period of 170 minutes, while a 10 wt. percent aqueous lime slurry was fed at the upper feed point at a rate of 350 to 700 grams per hour. The pot temperature was held at 100° C. and the temperature at the lime feed point varied from 85° to 87° C. A total of 1,360 grams of overhead was recovered, which by chromatograph analyzed as 65.4% propylene oxide, 2.1% methanol, 32.5% water and no methyl formate. An additional 24 grams of propylene oxide was recovered in the Dry Ice trap downstream from the condenser. A total of 1,547 grams of bottoms was recovered which analyzed as 0.1% propylene oxide, 0.2% propylene glycol and 99.7% water. Only 0.4% of the propylene oxide fed to the colunm was found in the bottoms stream. Pure propylene oxide was recovered by distillation of the overhead at atmospheric pressure, a pot temperature of 37°–102° C. and a head temperature of 34°–95° C. using a 10:1 reflux ratio. The column employed was 27 inches by 1 inch and was packed with Goodloe packing.

The data in Table III show results wherein propylene oxide synthetically contaminated with methyl formate is reacted with $Ca(OH)_2$ or NaOH in a countercurrent and distillation process to illustrate the improvement of our invention over the use of NaOH. The data for Sample 1 of Table III illustrate that $Ca(OH)_2$ reacts selectively with the methyl formate and allows the major part of the propylene oxide to be recovered. Sample 2 illustrates using NaOH instead of $Ca(OH)_2$. Although the methyl formate is completely removed from the propylene oxide in Sample 2, only 39% of the propylene oxide is recovered. This high loss of propylene oxide is not acceptable for an industrial process. Sample 1 illustrating our invention shows better than a 100% improvement in propylene oxide recovery over Sample 2. In Sample 3, where $Ca(OH)_2$ of our invention is used methyl formate is completely removed from propylene oxide and 97.5% of the propylene oxide is recovered.

TABLE III

| Sample | Oxide Feed, Grams | | Slurry, Grams Water | Slurry | Feed Rates, Grams/Hr. | | Temp., ° C. | | Top Column | Head |
|---|---|---|---|---|---|---|---|---|---|---|
| | Propylene Oxide | Methyl Formate | | | Oxide | Slurry | Pot | Slurry Feed Point | | |
| 1 | 900 | 100 | 1,800 | 200 $Ca(OH)_2$ | 200 | 2,000–6,000 | 88–100 | 42–62 | 35–80 | 34–40 |
| 2 | 950 | 50 | 1,800 | 200 NaOH | 200 | 2,000–6,000 | 90–102 | 68–74 | 30–34 | 28–33 |
| 3 | 950 | 50 | 1,800 | 200 $Ca(OH)_2$ | 200 | 350–700 | 100 | 86 | 80 | 83–88 |

| | Analysis, Weight percent | | | | | | |
|---|---|---|---|---|---|---|---|
| | Overhead | | | | Bottom | | Propylene Oxide Recovery, Percent |
| Sample | Propylene Oxide | Methyl Formate | Methanol | Water | Water | Propylene Oxide | Propylene Glycol | |
| 1 | 95.7 | Not detectable | 3.4 | 0.9 | 96.6 | 1.1 | 1.1 | 88 |
| 2 | 99.8 | do | 0 | 0.2 | 87.5 | 0 | 10.7 | 39 |
| 3 | 65.4 | do | 2.1 | 32.5 | 99.7 | 0.1 | 0.2 | 97.5 |

The calcium hydroxide is a mildly alkaline material that saponifies the methyl formate. Under the conditions employed in the process, the calcium hydroxide does not promote appreciable hydrolysis of the propylene oxide. It is to be understood that calcium oxide may be employed; however, when it is slurried with water it is converted to the hydroxide.

The process may be used for the purification of propylene oxide containing virtually any amount of methyl formate ranging from any detectable quantity up to 10% or more. The concentration of calcium hydroxide in the aqueous slurry in the batch process is preferably about 25% in excess of the stoichiometric equivalency of the amount of methyl formate present. In the continuous process the concentration of calcium hydroxide in the aqueous slurry may be any amount which can be conveniently handled. It is necessary only that the amount of calcium hydroxide fed to the column is at least stoichiometrically equivalent to the amount of methyl formate to be removed from the propylene oxide. Preferably, of course, an excess of calcium hydroxide is employed in the continuous process. The maximum to be used is limited only by practical considerations involved in handling large amounts of the slurry. We have had particularly good success using about a tenfold excess in the continuous process.

We claim:
1. A method for the removal of methyl formate from propylene oxide which comprises:
    introducing into a vessel (1) propylene oxide containing methyl formate and (2) an aqueous slurry of calcium hydroxide in an amount at least stoichiometrically equivalent to the methyl formate,
    establishing temperature and presure conditions within the vessel to produce a reaction between methyl formate and the calcium hydroxide and
    separating and recovering propylene oxide substantially free of methyl formate from the vessel.
2. A method for the removal of methyl formate from propylene oxide according to claim 1 in a batch process wherein the vessel is a closed vessel and the additional element of stirring the vessel contents.
3. A method for the removal of methyl formate from propylene oxide according to claim 2 wherein the calcium hydroxide is in an amount about 1.25 times the stoichiometric equivalent of methyl formate present.
4. A method for the removal of methyl formate from propylene oxide in a continuous process which comprises:
    introducing propylene oxide containing methyl formate continuously into a column and simultaneously introducing an aqueous slurry of calcium hydroxide into the column at a point above the point at which the propylene oxide is introduced and continuously removing the propylene oxide substantially free of methyl formate overhead and the aqueous slurry of calcium hydroxide containing calcium formate as bottoms, the column being operated at a temperature above the boiling point of propylene oxide but below about 100° C., the feed rates of the propylene oxide and aqueous slurry being such that the amount of calcium hydroxide is at least stoichiometrically equivalent to the methyl formate, and the temperature and feed rates being correlated to minimize the amount of propylene oxide in the bottoms.
5. A method for the removal of methyl formate from propylene oxide according to claim 4 wherein the temperature is within the range of from about 35° to about 100° C.

References Cited

UNITED STATES PATENTS

| 2,081,189 | 5/1937 | Wiezevich | 203—18 |
| 2,280,794 | 4/1942 | Cass | 203—36 |
| 2,550,847 | 5/1951 | Mitchell et al. | 260—348 |
| 2,622,060 | 12/1952 | Robeson et al. | 203—37 |
| 3,330,741 | 7/1967 | Thielig et al. | 203—36 |
| 3,350,417 | 10/1967 | Binning et al. | 203—37 |

WILBUR L. BASCOMB, JR., Primary Examiner

U.S. Cl. X.R.

260—348